April 26, 1938.　　　T. W. ALLEN ET AL　　　2,115,605
CARDING MACHINE
Filed June 2, 1934　　　8 Sheets-Sheet 3

Inventors
Thomas W. Allen
William F. Bokum
John H. Senior
Harmon B. Tlicht
by their Attorneys
Howson & Howson April 26, 1938. T. W. ALLEN ET AL 2,115,605
CARDING MACHINE
Filed June 2, 1934 8 Sheets-Sheet 4

April 26, 1938. T. W. ALLEN ET AL 2,115,605
CARDING MACHINE
Filed June 2, 1934 8 Sheets-Sheet 5

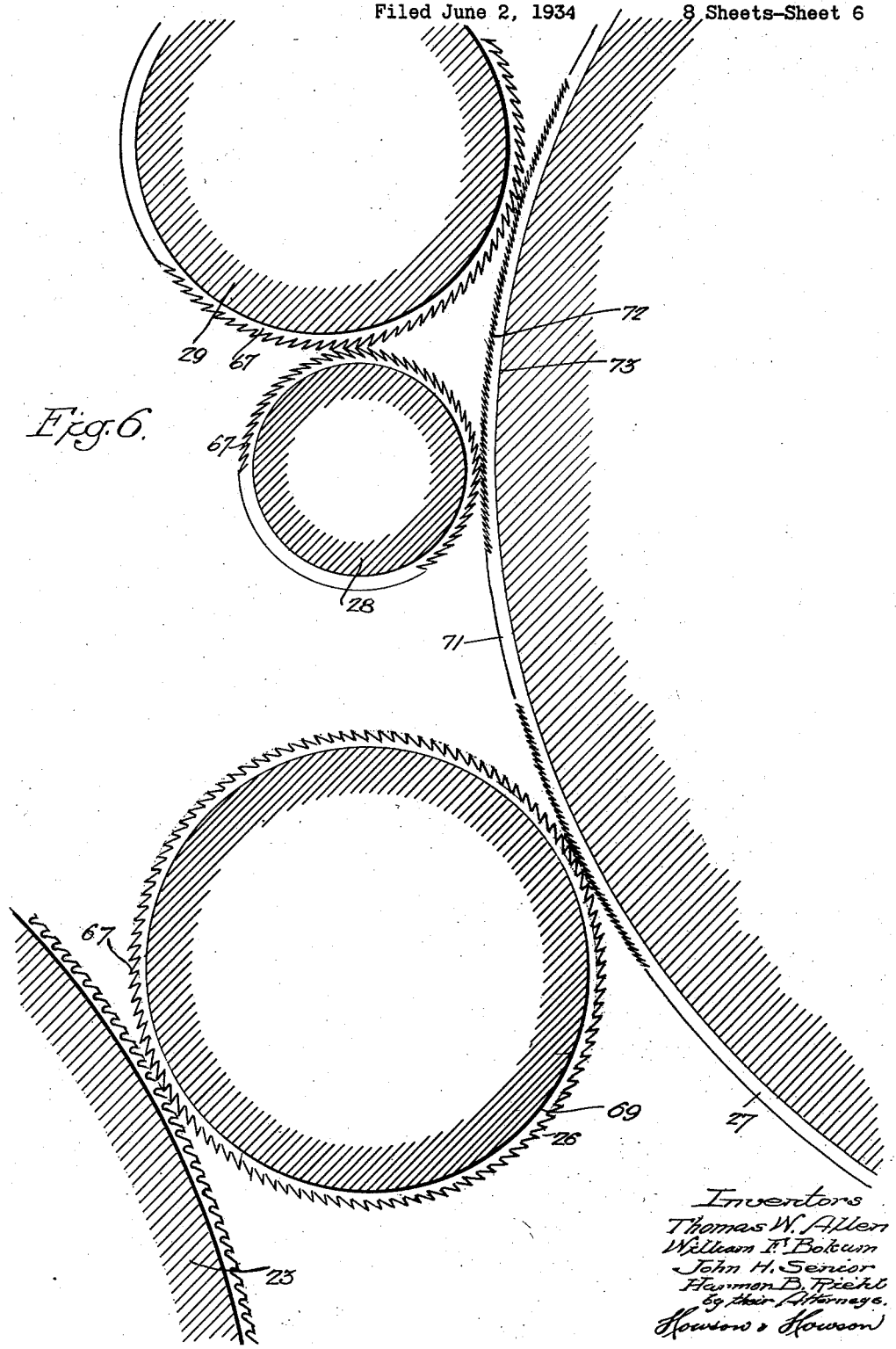

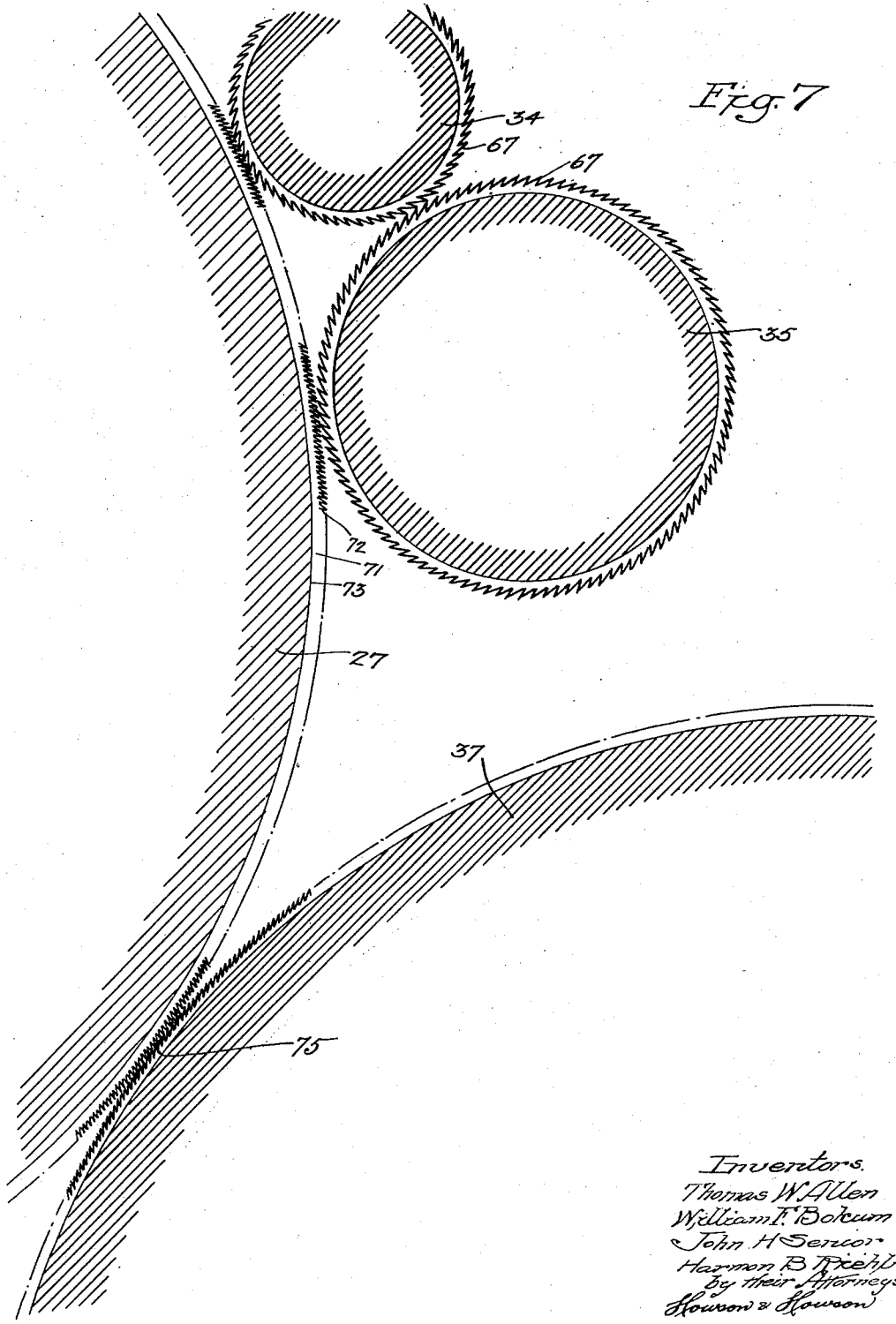

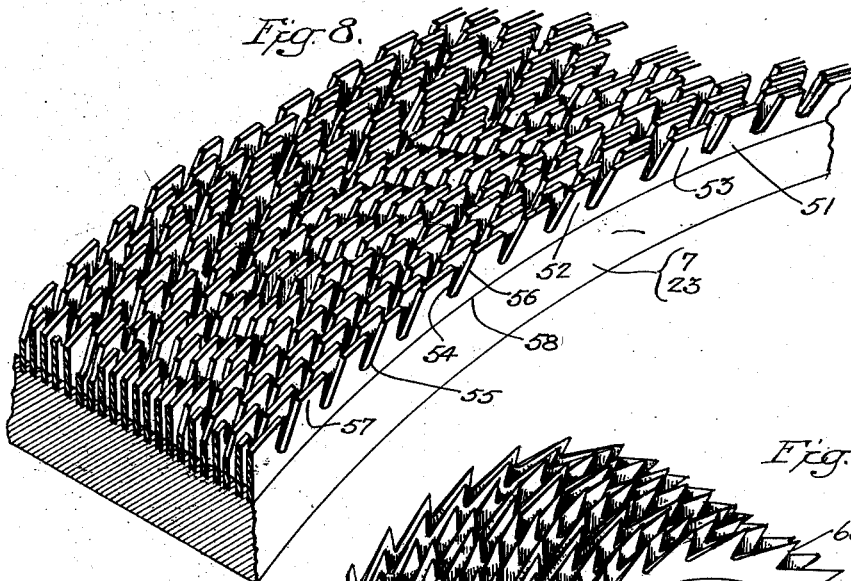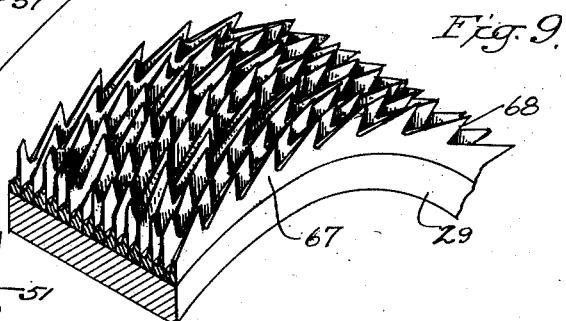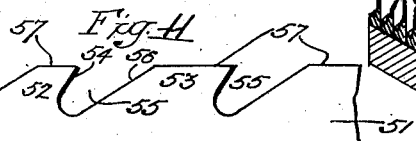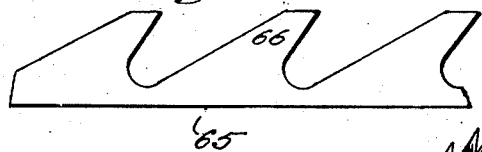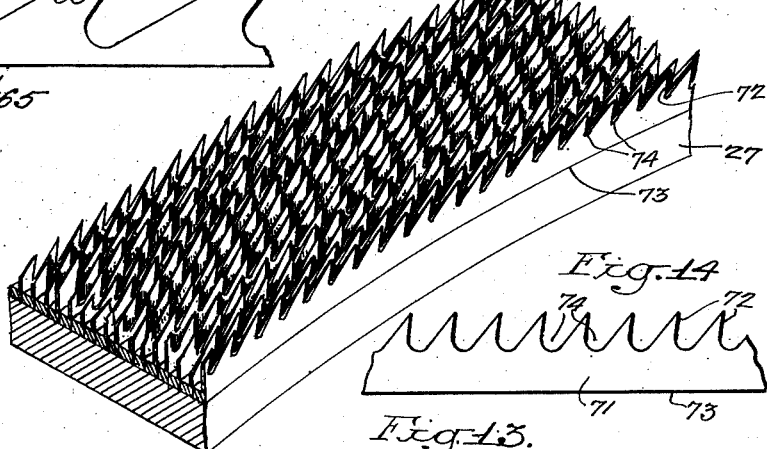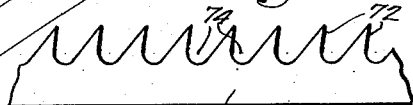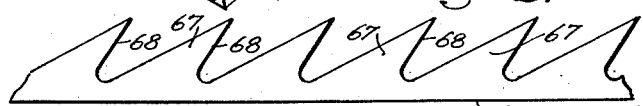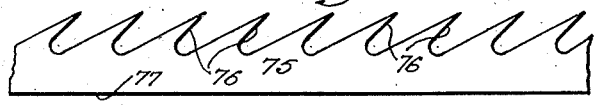

Patented Apr. 26, 1938

2,115,605

UNITED STATES PATENT OFFICE 2,115,605

CARDING MACHINE

Thomas W. Allen and John H. Senior, Philadelphia, William F. Bokum, Jenkintown, Pa., and Harmon B. Riehl, Newton Highlands, Mass., assignors to Proctor & Schwartz, Incorporated, Philadelphia, Pa., a corporation of Pennsylvania Application June 2, 1934, Serial No. 728,772

20 Claims. (Cl. 19—99)

This invention relates to improvements in carding machines for fibrous materials, and especially to those machines used in the carding of long staple wool fibers in the course of the manufacture thereof into worsted yarns. Wool normally contains a large quantity of burrs, shive, straw, and other vegetable matter. The carding machines now in general use are incapable of removing such substances from the wool, consequently the wool is normally subjected to chemical treatment to destroy these objectionable substances. Chemical treatment for the removal of foreign matter has an injurious effect upon the wool, in some instances to an extent which materially reduces the commercial value or usefulness of the wool for the making of worsted yarns and other purposes. Furthermore, the chemical treatment adds to the cost of refining the wool, by reason of the extra handling and additional step involved in the processing of the wool.

Carding machines for fine long staple wool, intended for use in the manufacture of worsted yarns, are normally provided with one or more swifts or carding cylinders about which are arranged the worker, stripper and fancy rolls, all of which are covered with conventional, flexible wire-toothed carding cloth. In the course of working of the wool fibers between the relatively movable wire-clothed surfaces of the carding cylinder and worker rolls the fibers become deeply embedded or buried in the bent-wire teeth on the face of the carding cylinder, and it is the function of the fancy rolls to draw the wool fibers from the roots of the bent wires to the outer peripheral surface of the carding cylinder for removal therefrom by the doffer, which latter also consists of a roll faced with flexible wire-toothed card clothing.

In order to raise the wool fibers to the outer surface of the carding cylinder, the fancies must revolve at a relatively high rate of speed and such high rotational velocity creates wind currents which have a tendency to disturb the substantially parallel relationship of the fibers in the more or less light, fluffy web into which the fibers are formed during the course of the carding operation. In many instances the web or a portion thereof is blown into folds or blown entirely off the cylinder. In other instances, the fancies roll the fibers into nebs or pellets. The fancies also tend to become clogged which reduces their effectiveness in performing their intended purpose, hence, the wool fibers are carried repeatedly to the workers by the carding cylinder which causes the long staple fibers to become broken as a result of excessive working.

The primary object of the present invention is to provide a carding machine for long staple wool which will effectively separate and remove the burrs, shive, straw and other vegetable matter from among the fibers, whereby the necessity for chemically treating the wool is effectively eliminated and the natural strength and other inherent characteristics of the wool are preserved.

Another object of the invention is to eliminate the fancy rolls, thereby removing the cause of one of the troublesome conditions incidental to wool carding as practiced heretofore.

Another object of the invention is to eliminate the flexible bent-wire-tooth card clothing and to replace it with rigid-punched-tooth facing material, whereby the wool-engaging teeth on the surfaces of the several rolls and/or the teeth on any one roll may be varied as to shape, size, rake-angle, lateral and circumferential spacing, uniformity or non-uniformity of length circumferentially of the cylinder or roll covered therewith, and as to the relation of the teeth one to another, as may be desired or found necessary for or in accordance with the particular function for which the rigid teeth of each of the respective rolls is intended.

The present invention contemplates the use of rolls having irregularly sized and spaced teeth for working the particles of objectionable foreign matter to the outer surface of a roll; and means cooperating with these peculiarly arranged teeth for working or teasing the fibers loose from the foreign matter and for eventually removing the foreign matter from the surface of the roll, while the loosened fibers are retained on the roll.

The present invention also contemplates the use of particularly shaped teeth on the swift or carding cylinder, which have a peculiar rake angle for automatically raising the carded fibers out of the gullets of the teeth, for removal from the swift by the doffer, without necessitating the use of fancies; and special teeth on the doffer cooperating with the special teeth on the carding cylinder for more effectively removing the fleece or web from the carding cylinder.

Other objects and features of the invention will become apparent in the course of the description of the structural characteristics and operation of the machine, as will be readily understood upon referring to the accompanying drawings; of which:

Fig. 6 is an enlarged vertical longitudinal sectional elevation of a main carding cylinder and the small burr-extracting cylinder with a transfer roll therebetween and a worker and a stripper cooperating with the main carding cylinder;

Fig. 7 is an enlarged vertical longitudinal sectional elevation showing the main carding cylinder and a doffer cooperating therewith;

Figs. 8, 9, and 10 are enlarged fragmentary perspective views illustrating the staggered relation of the rigid teeth on the burring cylinders, the workers, strippers, doffers and the main preliminary and finishing carding cylinders of the machine; and Figs. 11 to 15 inclusive are enlarged side views of the various kinds of rigid-toothed wire used for facing the various cylinders and rolls of the machine.

Figure 1:
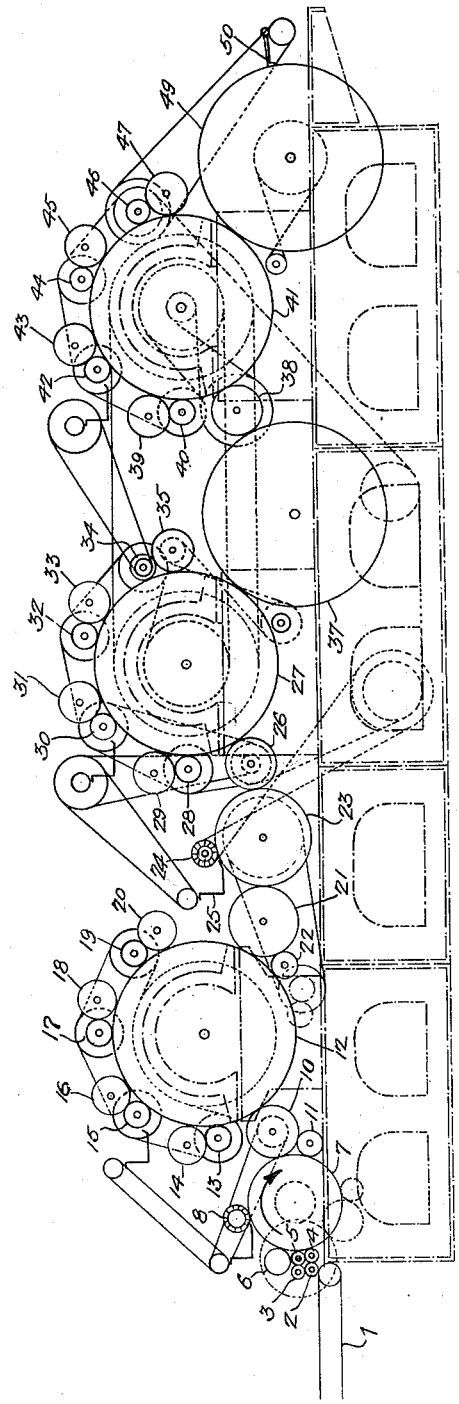
Fig. 1 is a diagrammatic side elevation of a machine constructed and assembled in accordance with the principles of the present invention.

As shown in Fig. 1, the machine comprises any suitable form of framework for operatively supporting the various rolls, cylinders, and other operating elements of the machine.

In the normal operation of the machine, the woolen fibers are fed to one end of the machine in any convenient manner, such as by an endless conveyer 1 which delivers the fibers into the bite of a first pair of feed rolls 2—3, which revolve at a predetermined rate of speed. The first pair of feed rolls 2—3 deliver the fibers to a second pair of feed rolls 4—5, which revolve at a relatively faster speed than the first pair of feed rolls, to draw out the matted wool fibers. The upper roll 5 of the second pair of feed rolls delivers the initially drawn out but matted fibers to the peripheral surface of the first or coarse burring cylinder 7.

A brush roll 6 operating in conjunction with the feed roll 5 and burring cylinder 7 cleans the former of and presses the fibers into the teeth of the latter, leaving the large burrs and coarse shive held on the outer peripheral face of the cylinder.

The burring cylinder 7, revolving in the direction of the arrow indicated in Fig. 1, carries the wool, burrs and shive upwardly, to be engaged by a roll 8 which rotates at a relatively higher peripheral speed than the burring roll 7. The roll 8 teases the fibers off the coarse shive and burrs and removes the loosened foreign material from the burring roll 7, throwing it into a suitable trough or other container 9 which extends transversely of the machine adjacent and parallel to the teasing roll 8.

From the teasing roll 8, the fibers which are embedded in the face of the burring roll 7 are carried thereby to a transfer roll 10. The transfer roll 10 removes the fibers from the burring roll 7 and deposits them on a combing or distangling cylinder 12. A worker-stripper roll 11 functions, in the angle between the burring roll 7 and the transfer roll 10, to remove adhering fibers from the former and to deposit them on the latter.

Distributed around the periphery of the combing or distangling cylinder 12 is a series of workers 14, 16, 18, and 20 and a series of strippers 13, 15, 17, and 19 which respectively cooperate with said workers for removing adhering fibers therefrom and for redepositing such fibers on the combing cylinder 12.

After leaving the final combing worker 20, the initially combed fibers, among which is still to be found fine shive and relatively small burrs, is brought into contact with a brush roll 21, which removes the initially combed or opened wool fibers from the combing or distangling cylinder 12 and permits loose fine shive and/or straw particles to drop out of the fibers.

In the angle formed between the periphery of the distangling cylinder 12 and the periphery of the brush 21, is a smooth face roll 22 which catches fibers dropping from the combing or distangling cylinder 12 and delivers them back onto the brush roll 21.

The brush roll 21 carries and delivers the fibers in which some fine shive, straw and small burrs remain to a second or fine burring cylinder 23 and presses or embeds the fibers in the facing material thereof, which causes the fine shive, straw and burrs to remain on the outer peripheral surface of the second burring cylinder 23.

The fine burring cylinder 23 carries the fibers upwardly into engagement with a teasing roll 24, which cleans the fibers from off the foreign matter and throws the foreign matter into a suitable trough or container 25 disposed transversely of the machine adjacent and parallel to the teasing roll 24.

The fibers, now devoid of foreign matter, are removed from the fine burring cylinder 23 and carried to and deposited on the main carding cylinder 27 by a transfer roll 26.

Distributed around the periphery of the main carding cylinder 27 is a series of workers 29, 31, 33, and 35 with which cooperate a series of strippers 28, 30, 32, and 34 respectively. The cleaned fibers are here given a preliminary or first carding between the facing of the main carding cylinder 27 and the facing of the workers 29, 31, 33, and 35, after which they are removed from the main carding cylinder 27 by a doffer 37.

The cleaned and initially carded fibers are taken from the doffer 37 by a transfer and stripper roll 38 and deposited thereby on a main or finishing carding cylinder 41 of a second or finishing set.

Disposed around the periphery of the finishing cylinder 41 is a series of worker rolls 39, 43, 45, and 47 with which cooperate respectively, a series of stripper rolls 40, 42, 44, and 46.

After leaving the last worker 47 of the finishing set, the then finally carded fibers are removed from the finishing cylinder 41, by a doffer 49 from which the web or fleece is subsequently removed by the usual form of oscillating comb 50.

Figure 2:
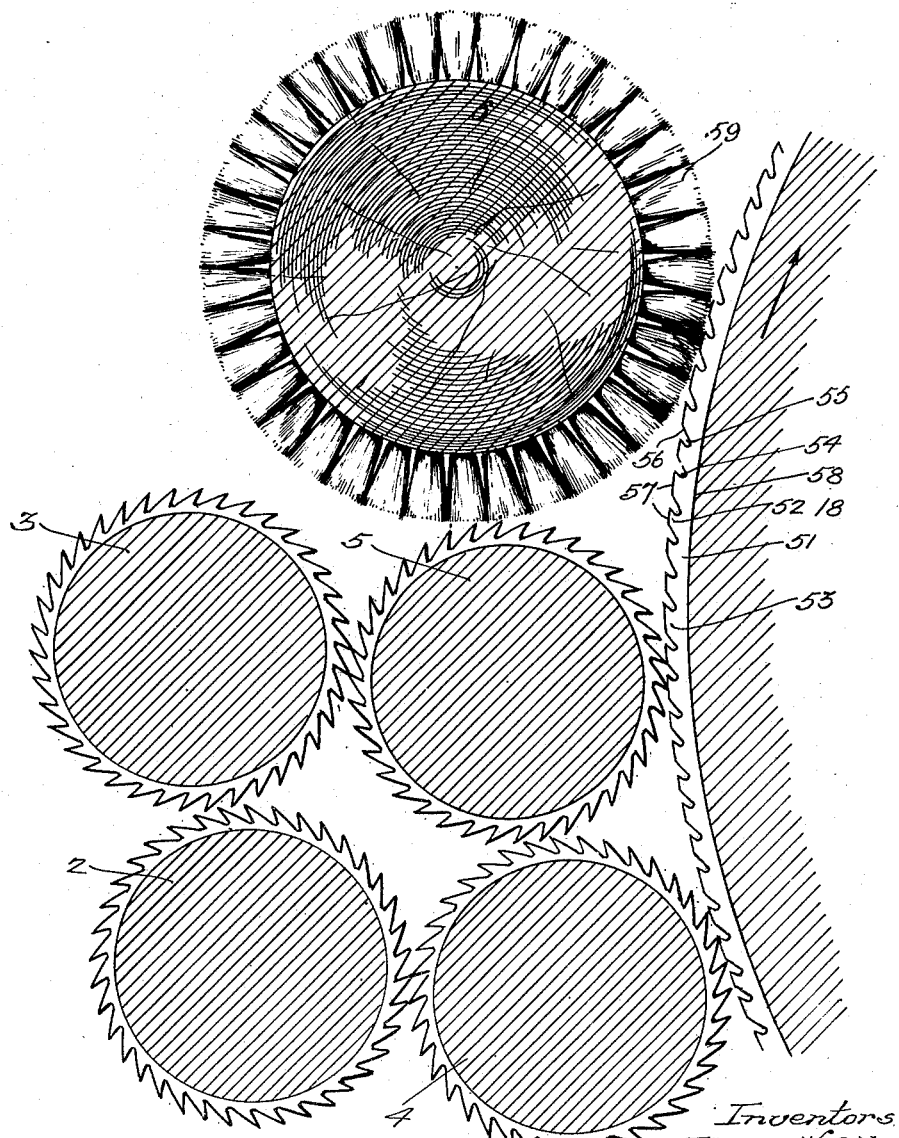
Fig. 2 is an enlarged longitudinal vertical sectional elevation of the fibre feeding and coarse burr cylinder charging mechanisms of the machine.

As shown in Fig. 2, the feed rolls 2, 3, 4, and 5 are covered with the usual coarse, rigid-toothed, sharp-pointed wire, wound spirally on the face of the rolls, the circumferential and lateral spacing of the teeth on the face of the feed rolls being relatively wide for receiving and initially opening up and drawing out the matted fibers which contain the foreign matter, above referred to, with a minimum of breakage of both the fibers and the foreign matter.

The first burring cylinder 7 is clothed with a special rigid tooth wire 51 shown per se in Fig. 11, and which is spirally wound on and secured to the face of the roll 7, as shown in Figs. 2 and 8. The teeth of the wire 51 are of irregular sizes circumferentially of the roll and include variations in length from a minimum sized tooth 52, to a maximum sized tooth 53. However, the rake angle 54, at the front edge of each tooth, and the gullet 55, between the rake angle of the one tooth and the clearing angle 56 of the next tooth, are substantially the same throughout the length of the wire. The tops 57 of the teeth are flat and, while they vary in length in accordance with the size of the various teeth, the flat tops 57 are all disposed substantially in a single or common plane substantially parallel to the base 58 of the wire.

On the first burring roll 7 the convolutions of the wire 51 are wound on the face of the roll at a lateral spacing of "18 convolutions per inch" which is sufficiently close to prevent the large particles of foreign matter such as burrs, shives or straw from entering between the convolutions and being burred or embedded in the facing material and yet permitting the fibers to be embedded in the facing material below the circularly aligned tops 57 of the teeth.

The fibers are pressed into the facing material by the bristles of the brush roll 6 which are relatively stiff and close and thereby press the fibers down below the tops 57 of the teeth of the wire 51, causing the large burrs or pieces of other foreign matter to ride out and stay on the tops 57 of the teeth where they are held by such fibers as may have been in straddling relation to the particles of foreign matter when the fibers were being pressed in the face of the cylinder 7 by the bristles 59 of the brush 6.

Figure 3:
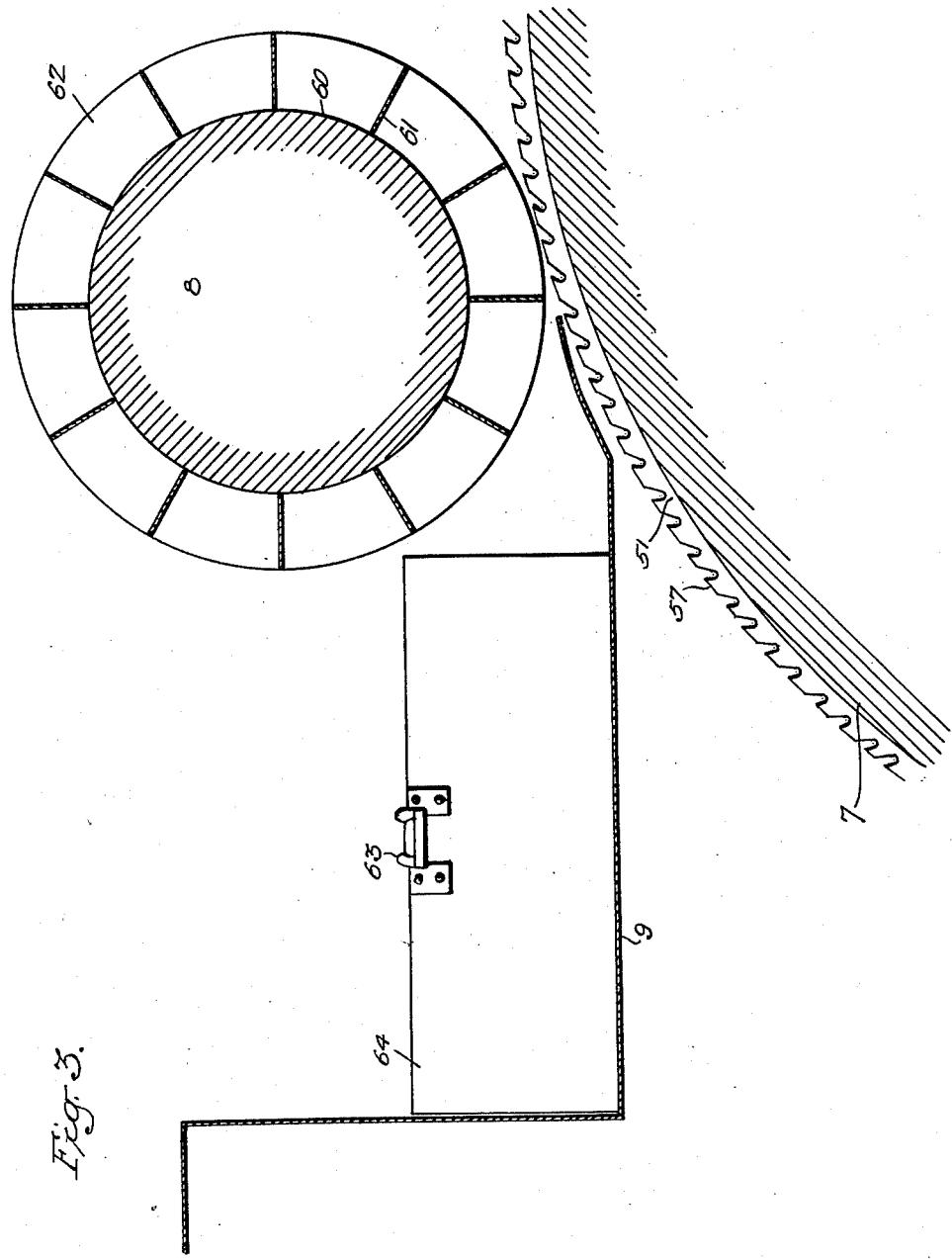
Fig. 3 is an enlarged longitudinal vertical sectional elevation of a coarse burr-extracting mechanism.

The fibers which are embedded in the facing of the burring roll 7 and the coarse shive and large burrs which are held on the tops 57 of the irregular teeth of which said facing material of the cylinder 7 is composed, as noted above, are carried up to the burr-knocker or teasing roll 8 which, as shown in Fig. 3, is composed of a cylindrical body 60 having angularly spaced radially projecting ribs or fins 61 thereon which extend longitudinally of the roll 8, substantially parallel to the axis of said roll, between flanges 62, 62 at the opposite ends of the roll 8 respectively. If desired, the ribs 61 may be arranged spirally on and around the face of the body 60 of the roll 8.

The burr-knocker or teasing roll 8 is rotated at a relatively high speed and, in engaging, wiping and rubbing over the burrs or other foreign matter sticking out on and from the outer surface of the roll 7, works or teases the straddling fibers off the particles of foreign matter and finally loosens the objectionable substances from the fibers.

The roll 8 finally removes the objectionable particles from the roll 7 and throws them into the trough 9, from which they may be removed manually or by any suitable automatic conveyer or scraper operating in the trough 9 to carry the foreign matter off to one side of the machine. In the present instance, a conveyer comprising the usual form of link belt 63 having a series of scraper attachments 64 secured thereto is shown for the purpose of removing the foreign matter from the machine longitudinally of the trough 9.

Figure 4:
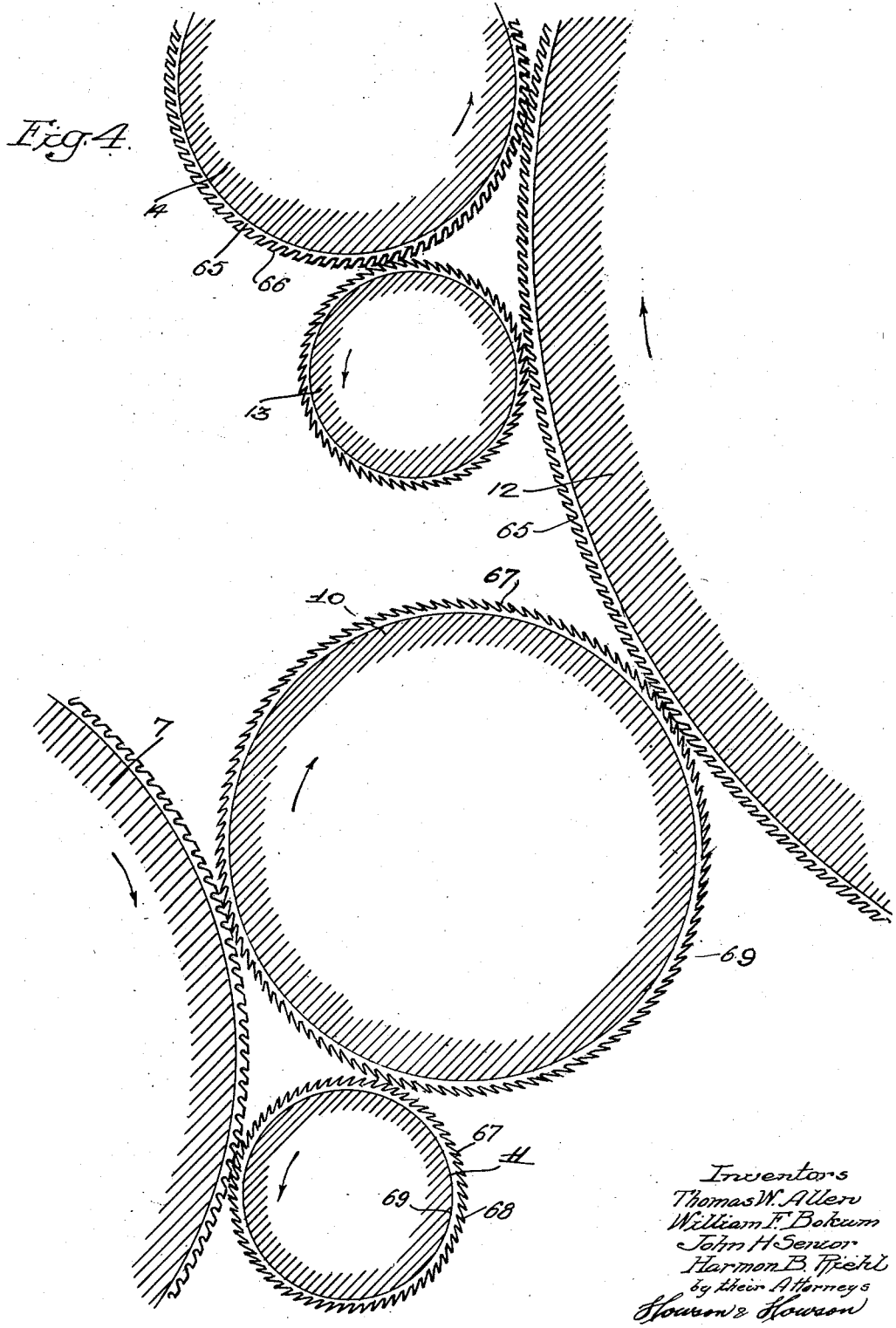
Fig. 4 is an enlarged vertical longitudinal sectional elevation showing a part of the large burr-extracting cylinder, a portion of a combing cylinder, a transfer roll between the burring and combing cylinders, a pair of worker and stripper rolls associated with the combing cylinder, and a worker-stripper roll operating between the burring cylinder and the transfer roll.

The fibers and fine particles of foreign matter embedded in the facing of the first burring cylinder 7, as stated above, are removed therefrom by the transfer roll 10 which, as shown in Fig. 4, is clothed with a rigid-toothed wire, of the character shown in Fig. 12, spirally wound on the face thereof at a spacing of substantially "10 convolutions per inch". The wire 65 on the transfer roll 10 is similar in character to the wire on the burring cylinder 7, with the exception that the teeth, while being flat on their tops, are regularly or uniformly shaped, sized, and spaced circumferentially of the roll as shown in Fig. 4. The top-flat of the regular, uniform teeth 66 (see Fig. 12) of the facing wire 65 of the transfer roll 10 is substantially smaller than the minimum size teeth 52 of the cylinder 7.

Such matted fibers as still adhere to the cylinder 7 after passing the transfer roll 10 are removed therefrom by the worker-stripper roll 11 above described as operating in the lower angle formed between the peripheries of the cylinder 7 and transfer roll 10 respectively, which delivers such fibers to the transfer roll 10. The teeth 67 of the wire on the worker-stripper roll 11 are of the ordinary sharp-pointed type shown in Fig. 13 having a rake angle 68 disposed at substantially 37° to a line drawn perpendicular to the base line 69 of the wire in which the teeth are formed, such angle of 37° being common in ordinary sharp-pointed wire.

The transfer roll 10 delivers the partially cleaned fibers to the combing or distangling cylinder 12 which is clothed with convolutions of the wire 69 of the same character as that on the transfer roll 10 and which is shown per se in Fig. 13. The worker rolls 14, 16, 18, and 20 which cooperate with the combing or distangling cylinder 12 are clothed with the uniform toothed wire 65, of Fig. 12, wound at a lateral spacing of substantially "10 convolutions to the inch", the same lateral spacing as the wire on the combing or distangling cylinder 12 and transfer roll 10.

The teeth of the combing or distangling cylinder 12 and workers 14, 16, 18 and 20 effect a gradual opening up of the wool flocks without breaking up the small burrs and shive contained therein. The stripper rolls 13, 15, 17, and 19, which respectively cooperate with the workers 14, 16, 18, and 20, are clothed with the ordinary sharp-pointed wire of Fig. 13 as above noted and function to remove the unopened wool fibers which adhere to the workers and return them to the main combing cylinder 12.

Figure 5:
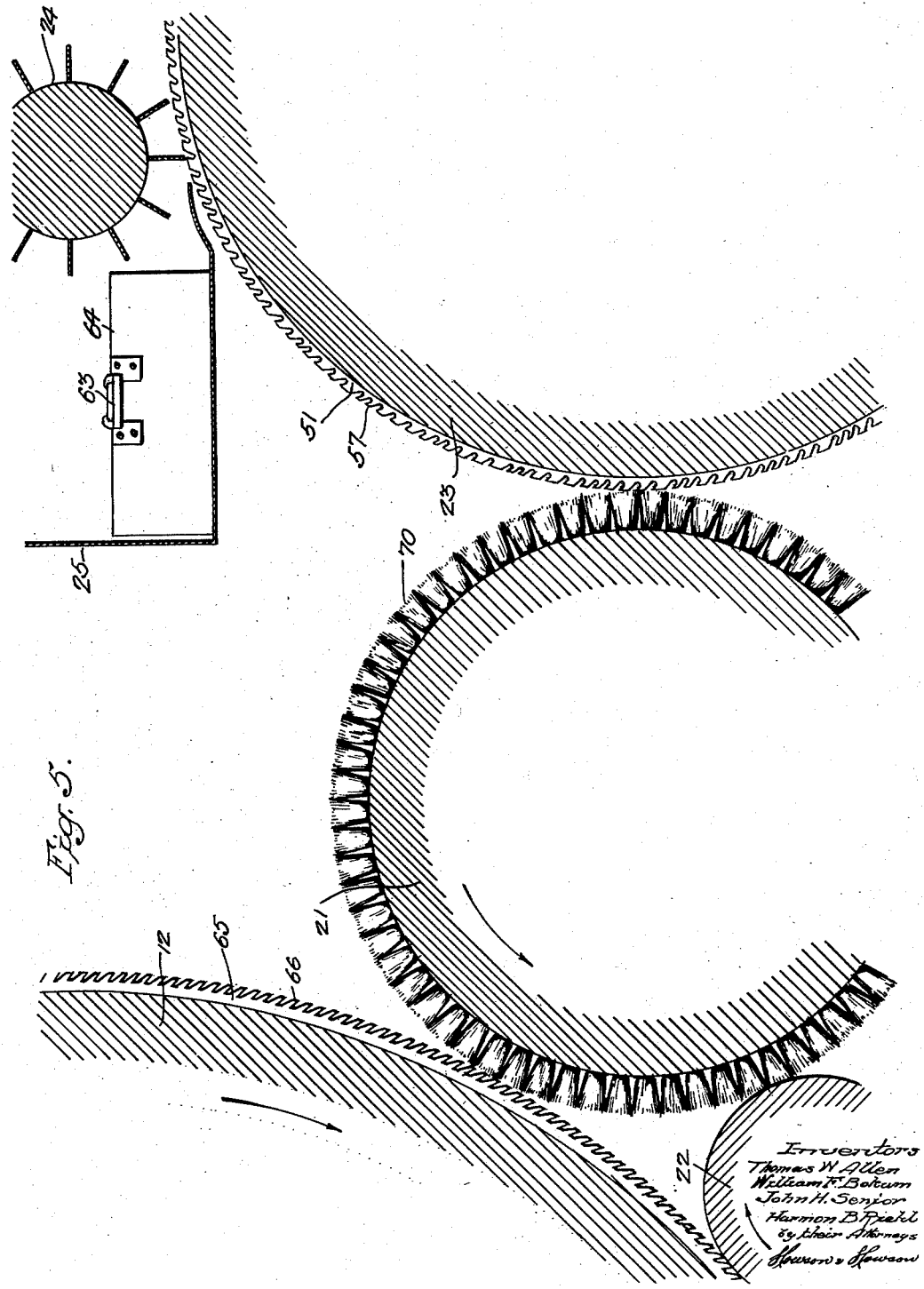
Fig. 5 is an enlarged vertical longitudinal sectional elevation of the combing cylinder and a small burr-extracting cylinder with a transfer brush-roll therebetween.

As shown in Fig. 5, the combing or distangling cylinder 12 carries the then opened fibers into the proximity of the brush roll 21, the bristles 70 of which are set close together and thereby effectively remove the open wool fibers from the surface of combing or distangling cylinder 12 permitting those of the shive and straw particles which have become loosened from the fibers in the course of combing thereof to drip out from among the fibers as the fibers are being carried on the face of the brush 21.

Any of the fibers which become loosened and drop from the combing or distangling cylinder 12 and which are not caught by the bristles of the brush roll 21 fall on to the smooth face of the roll 22 which, as noted above, is disposed in the angle between the peripheries of the combing or distangling cylinder 12 and brush roll 21, and which, with the roll 22 turning in the direction of the arrow in Fig. 5, are carried into contact with the bristles 70 of the brush 21 to be picked up thereby.

As noted above, the brush roll 21 carries the fibers which still contain some fine particles of shive, straw and burrs into contact with the peripheral surface of the second or fine burring cylinder 23. This cylinder is covered with the irregularly toothed wire 51 of Fig. 11, the same as the first burring roll 7. However, where the convolutions on the first burring roll 7 were spaced "18 to the inch" the convolutions of the wire 51 on the face of the second burring cylinder 23 are spaced relatively closer together, at substantially "32 to the inch". Thus the bristles 70 of the brush 21 press the wool fibers down below and between the flat top edges 57 of the teeth of the wire 51 on the burring cylinder 23, but, due to the close lateral relationship of the teeth, the fine particles of shive, straw and small burrs are prevented from entering between the teeth and are supported on the flat surfaces 57 of the teeth to be engaged by the teasing roll 24.

The teasing roll 24 is constructed in the same manner and operates at substantially the same high speed as the teasing roll 8, to work the fibers, which are straddling the fine particles of foreign matter, off said foreign matter, whereby said particles are loosened and thrown by the blades or fins of the roll 24 into the trough 25.

The trough 25, like the trough 9, is provided with any suitable form of conveyer for automatically carrying the particles of foreign matter off to one side of the machine.

The burring roll 23 (see Fig. 6) delivers the then cleaned and initially combed fibers to the transfer roll 26 which is clothed with wire 65 having regular uniform teeth 66 (see Fig. 12) the same as the combing cylinder 12, the transfer roll 10 and the workers 14, 16, 18, and 20 which cooperate with the cylinder 12.

The transfer roll 26 delivers the cleaned combed fibers to the first carding cylinder 27 which is clothed with sharp-pointed rigid-toothed wire 71 such as shown per se in Fig. 14, the pitch of spacing of the points being approximately equal to the depth and the rake angle of the teeth disposed at an angle anywhere from 10° to 20° to a line drawn perpendicular to the base line of the wire. In the present instance, the wire 71 (Fig. 14) is composed of teeth having a rake angle 72 disposed at substantially 12° to a line drawn perpendicular to the base line 73 of the wire 71.

The circumferential spacing of the 12° sharp-pointed teeth of the wire 71 on the cylinder 27 is approximately 12 points to the inch, although it may be greater or less if desired provided the rake angle is maintained at substantially 12° which has been found most effective for the purpose. The lateral spacing of the wire 71 on the carding cylinder 27 is substantially "18 convolutions per inch".

The steep 12° angle of the teeth and the speed at which the cylinder operates prevents the fibers from packing down firmly in the gullets 74 between the teeth. Thus the cylinder is made to be self-clearing and does not require the use of the high speed fancies to lift the fibers to the surface of the cylinder after working by the working rolls distributed around the cylinder.

In the present instance, the worker rolls 29, 31, 33, and 35 spaced around the periphery of the first carding cylinder 27 and the strippers 28, 30, 32, and 34 respectively cooperating therewith are clothed with sharp high fine rigid toothed wire, that is a wire having approximately five points to the inch circumferentially of the rolls and the usual rake angle of about 37° to a line perpendicular to the line of the base of the wire, as shown in Fig. 13. These worker and stripper rolls are spirally wound with this fine rigid tooth wire at a lateral spacing of substantially "18 to the inch".

The first carding cylinder 27 carries the initially carded fibers to the doffer 37, as illustrated in Fig. 7. The doffer 37 is provided with sharp-pointed fine rigid-toothed wire 75, the points of which, as shown in Fig. 15, are spaced at approximately "8 to the inch" circumferentially of the doffer with a rake angle 76 of 45° to a line perpendicular to the base line 77 of the wire. The wire 75 is spirally wound on the doffer 37 at a lateral spacing of "22 convolutions to the inch" which cooperates with the 12°, 12 point "18 convolutions per inch" lateral spacing of the wire 71 on the main carding cylinder 27, to remove the initially carded fibers effectively from said cylinder.

The doffer 37 delivers the fleece to the transfer roll 38 which, like the transfer rolls 10 and 26, is provided with regularly spaced sharp-pointed teeth 67 shown in Fig. 13.

The transfer roll 38 delivers the fleece to the main cylinder 41 of the finishing set, which, with the carding cylinder 41, includes the cooperating workers 39, 43, 45, and 47 and the stripper rolls 40, 42, 44, and 46. The finishing cylinder 41 is clothed with the sharp pointed fine tooth wire 71 of Fig. 14, in the same manner as the main carding cylinder 27 of the preliminary set with the exception that the lateral spacing of the wire 71 on the cylinder 41 is arranged at "24 convolutions per inch", as compared with the "18" convolution spacing of the cylinder 37.

The workers 39, 43, 45, and 47 of the finishing set are clothed with the same sharp-pointed fine rigid tooth wire of Fig. 13, the same as the worker rolls 29, 31, 33, and 35 of the preliminary set, but at a spacing of "24 convolutions per inch" as compared with "18 convolutions per inch" on the workers of the preliminary.

The finishing cylinder 41 delivers the finally carded fiber to the doffing roll 49 which, like the doffing roll 37, is provided with the fine, sharp-pointed, rigid tooth wire 75 of Fig. 15. The lateral spacing of the wire 75 on the doffer 49 is arranged at "26 convolutions per inch" as compared with the "22 convolutions per inch" on the doffer 37.

The finished fleece, as noted above, is removed from the doffer 49 by the usual oscillating comb 50, which delivers the fleece onto any suitable form of conveyer not shown and by which the fleece is carried to machines for performing the next step in converting the carded fibers into worsted yarns.

We claim:

1. In a wool carding machine, means for carding the wool, means for extracting coarse foreign matter from the wool preparatory to said carding, means for extracting fine foreign matter from the wool intermediate said coarse extraction and said carding, means for initially distangling the wool intermediate said coarse and fine extractions, means for transferring the wool from the coarse extractor to the distangling means, means for transferring the distangled wool from the distangling means to the fine extractor, means for catching loose wool dropping from the distangling means and returning it to the last said transferring means, and means for transferring the cleared wool from the fine extractor to the carding means.

2. In a wool carding machine, means for carding the wool, means for extracting coarse foreign matter from the wool preparatory to said carding, means for extracting fine foreign matter from the wool intermediate said coarse extraction and said carding, means for initially distangling the wool intermediate said coarse and fine extractions, means for transferring the wool from the coarse extractor to the distangling means, means for transferring the distangled wool from the distangling means to the fine extractor and arranged to expel loose fines from the distangled wool in transit, means for catching loose wool dropping from the distangling means and returning it to the last said transferring means, and means for transferring the cleared wool from the fine extractor to the carding means.

3. In a wool carding machine, means for carding the wool, means for extracting foreign matter from the wool preparatory to said carding, comprising a cylinder provided with laterally spaced radially extending flat topped teeth with substantially right angle side edges arranged to engage and hold particles of foreign matter on the peripheral surface of the cylinder while allowing the wool to assume a position below said surface, and means cooperating with said teeth for disengaging the wool from said particles.

4. In a wool carding machine, means for carding the wool, means for extracting foreign matter from the wool preparatory to said carding comprising a cylinder provided with laterally spaced radially extending flat topped teeth with substantially right angle side edges arranged to engage and hold particles of foreign matter on the peripheral surface of the cylinder while allowing the wool to assume a position below said surface, means for embedding the wool in and among the flat topped teeth of the cylinder to effect said engagement and holding of the foreign matter particles by and on the flat tops of the teeth, and means cooperating with said teeth for disengaging the wool from said particles.

5. In a wool carding machine, means for carding the wool, means for extracting foreign matter from the wool preparatory to said carding, comprising a cylinder provided with laterally spaced radially extending flat topped teeth with substantially right angle side edges arranged to engage and hold particles of foreign matter on the peripheral surface of the cylinder while allowing the wool to assume a position below said surface, a rotary stiff bristle brush roll adjacent and cooperating with said cylinder for embedding the wool in and among the flat topped teeth of the cylinder to effect said engagement and holding of the foreign matter particles by and on the flat tops of the teeth, and means cooperating with said teeth for disengaging the wool from said particles.

6. In a wool carding machine, means for carding the wool, means for extracting foreign matter from the wool preparatory to said carding, comprising a cylinder provided with laterally spaced radially extending flat topped teeth with substantially right angle side edges arranged to engage and hold particles of foreign matter on the peripheral surface of the cylinder while allowing the wool to assume a position below said surface, means for embedding the wool in and among the flat topped teeth of the cylinder to effect said engagement and holding of the foreign matter particles by and on the flat tops of the teeth, and a rotary teasing roll comprising radial angularly spaced blades cooperating with said teeth for disengaging the wool from said particles.

7. In a wool carding machine, means for carding the wool, means for extracting foreign matter from the wool preparatory to said carding, comprising a cylinder provided with laterally spaced radially extending flat topped teeth with substantially right angle side edges arranged to engage and hold particles of foreign matter on the peripheral surface of the cylinder while allowing the wool to assume a position below said surface, a rotary stiff bristle brush roll adjacent and cooperating with said cylinder for embedding the wool in and among the flat topped teeth of the cylinder to effect said engagement and holding of the foreign matter particles by and on the flat tops of the teeth, and a rotary teasing roll comprising radial angularly spaced blades cooperating with said teeth for disengaging the wool from said particles.

8. In a carding machine, a foreign matter extracting roll having a working face composed solely of laterally spaced flat topped teeth irregularly proportioned circumferentially of the roll with the flat tops of the teeth having sharp substantially right angle side edges and lying substantially in and forming a common circular circumferentially grooved surface encircling the roll.

9. In a carding machine, a foreign matter extracting roll having a working face composed solely of flat topped teeth irregularly proportioned circumferentially of the roll and arranged in substantially parallel axially spaced transversely extending planes respectively with the flat tops of the teeth having sharp substantially right angle side edges and lying substantially in and forming and irregularly staggered throughout a common circular circumferentially grooved surface encircling the roll.

10. In a carding machine, a foreign matter extracting roll having a working face composed solely of flat topped teeth irregularly proportioned circumferentially of the roll and arranged in substantially parallel axially spaced transversely extending planes respectively with the flat tops of the teeth having sharp substantially right angle side edges and lying substantially in and forming and irregularly staggered throughout a common circular circumferentially grooved surface encircling the roll, and a teasing roll comprising radially extending elements in substantially peripherally tangential relation to the common circular surface formed by the flat tops of the teeth of the extracting roll.

11. In a carding machine, a foreign matter extracting roll comprising flat topped teeth irregularly proportioned circumferentially of the roll and arranged in substantially parallel axially spaced transversely extending planes respectively with the flat tops of the teeth lying substantially in and forming and irregularly staggered throughout a common circular circumferentially grooved surface encircling the roll, a combing cylinder comprising flat top teeth uniformly proportioned circumferentially of the cylinder, and a similarly uniformly flat toothed transfer roll operating between the peripheries of said extracting roll and combing cylinder.

12. In a carding machine, a foreign matter extracting roll comprising flat topped teeth irregularly proportioned circumferentially of the roll and arranged in substantially parallel axially spaced transversely extending planes respectively with the flat tops of the teeth lying substantially in and forming and irregularly staggered throughout a common circular circumferentially grooved surface encircling the roll, a combing cylinder comprising flat top teeth uniformly proportioned circumferentially of the cylinder, a similarly uniformly flat toothed transfer roll operating between the peripheries of said extracting roll and combing cylinder, and a sharp pointed rigid toothed roll operating on an angle formed by and between the peripheries of said extracting and transfer rolls in substantially peripheral tangential relation thereto.

13. In a carding machine, a foreign matter extracting roll comprising flat topped teeth irregularly proportioned circumferentially of the roll and arranged in substantially parallel axially spaced transversely extending planes respectively with the flat tops of the teeth lying substantially in and forming and irregularly staggered throughout a common circular circumferentially grooved surface encircling the roll, a combing cylinder comprising flat top teeth uniformly proportioned circumferentially of the cylinder, a similarly uniformly flat toothed transfer roll operating between the peripheries of said extracting roll and combing cylinder, and a plurality of similarly uniformly flat toothed worker rolls spaced circumferentially of and in substantially peripheral tangential relation to said combing cylinder.

14. In a carding machine, a foreign matter extracting roll comprising flat topped teeth irregularly proportioned circumferentially of the roll and arranged in substantially parallel axially spaced transversely extending planes respectively with the flat tops of the teeth lying substantially in and forming and irregularly staggered throughout a common circular circumferentially grooved surface encircling the roll, a combing cylinder comprising flat top teeth uniformly proportioned circumferentially of the cylinder, a similarly uniformly flat toothed transfer roll operating between the peripheries of said extracting roll and combing cylinder, a plurality of similarly uniformly flat toothed worker rolls spaced circumferentially of and in substantially peripheral tangential relation to said combing cylinder, and a plurality of sharp pointed rigid toothed rolls respectively operating in an angle formed by and between the peripheries of said combing cylinder and worker rolls in substantially peripheral tangential relation thereto.

15. In a carding machine, a combing cylinder comprising flat topped teeth uniformly proportioned circumferentially of the cylinder, a foreign matter extracting cylinder comprising flat topped teeth irregularly proportioned circumferentially of the cylinder, and a bristle brush roll operating between and substantially in peripheral tangential relation to the peripheries of said cylinders, for removing stock from the uniform teeth of the combing cylinder and pressing said stock between the irregular teeth of the extracting cylinder with said foreign matter supported by the flats of said irregular teeth on the extracting cylinder.

16. In a carding machine, a combing cylinder comprising flat topped teeth uniformly proportioned circumferentially of the cylinder, a foreign matter extracting cylinder comprising flat topped teeth irregularly proportioned circumferentially of the cylinder, a bristle brush roll operating between and substantially in peripheral tangential relation to the peripheries of said cylinders, for removing stock from the uniform teeth of the combing cylinder and pressing said stock between the irregular teeth of the extracting cylinder with said foreign matter supported by the flats of said irregular teeth on the extracting cylinder, and a smooth faced roll operating in an angle formed by and between the peripheries of said uniform-toothed cylinder and said bristle brush.

17. In a carding machine, a combing cylinder comprising flat topped teeth uniformly proportioned circumferentially of the cylinder, a foreign matter extracting cylinder comprising flat topped teeth irregularly proportioned circumferentially of the cylinder, a bristle brush roll operating between and substantially in peripheral tangential relation to the peripheries of said cylinders, for removing stock from the uniform teeth of the combing cylinder and pressing said stock between the irregular teeth of the extracting cylinder with said foreign matter supported by the flats of said irregular teeth on the extracting cylinder, a smooth faced roll operating in an angle formed by and between the peripheries of said uniform-toothed cylinder and said bristle brush, and a teasing roll comprising radially extending fin-like elements in substantially peripheral tangential relation to the flat irregular teeth of the extracting cylinder.

18. In a carding machine, a foreign matter extracting cylinder comprising flat topped teeth irregularly proportioned circumferentially of the cylinder, a carding cylinder comprising sharp pointed teeth uniformly spaced circumferentially of the cylinder and provided with forward rake edges steeply inclined with respect to the plane of the sharp points of the teeth, and a transfer roll operating between and in substantially tangential relation to the peripheries of said cylinders and comprising flat topped teeth uniformly proportioned circumferentially of the roll.

19. In a carding machine, a fibre arranging unit, a coarse foreign matter extracting unit preceding said arranging unit, and a fine foreign matter extracting unit following said arranging unit, said extracting units each comprising a roll faced with rigid toothed wire circumscribing the roll wherein the teeth are flat topped and of irregular lengths circumferentially of the roll and the teeth on the coarse extracting roll are spaced laterally in a direction longitudinally of the roll at a distance approximately twice as great as the corresponding lateral spacing of the teeth on the fine extractor roll.

20. In a carding machine, a main carding cylinder, worker and stripper rolls in cooperating pairs relatively spaced about the cylinder for working stock carried by the cylinder, a doffer functioning adjacent the cylinder to remove the carded stock therefrom, and sharply pointed teeth on said cylinder and having rake edges inclined steeply to the common substantially parallel base and tooth point planes respectively of the teeth at an acute angle of less than 20° to a plane perpendicular to said base and tooth point planes, and sharply pointed teeth on said doffer cooperating with said steeply inclined teeth on said cylinder and having effective edges opposing the effective steeply inclined cylinder tooth edges with the doffer tooth edges inclined to the common substantially parallel base and tooth point planes of the doffer teeth at an angle of substantially 45° for effectively removing said combed stock from the carding cylinder.

THOMAS W. ALLEN.
JOHN H. SENIOR.
WILLIAM F. BOKUM.
HARMON B. RIEHL.